US007383427B2

(12) United States Patent
Yamazaki

(10) Patent No.: US 7,383,427 B2
(45) Date of Patent: Jun. 3, 2008

(54) MULTI-SCALAR EXTENSION FOR SIMD INSTRUCTION SET PROCESSORS

(75) Inventor: Takeshi Yamazaki, Tokyo (JP)

(73) Assignee: Sony Computer Entertainment Inc. (JP)

( * ) Notice: Subject to any disclaimer, the term of this patent is extended or adjusted under 35 U.S.C. 154(b) by 440 days.

(21) Appl. No.: 11/110,307

(22) Filed: Apr. 20, 2005

(65) Prior Publication Data

US 2005/0251655 A1 Nov. 10, 2005

Related U.S. Application Data

(60) Provisional application No. 60/564,673, filed on Apr. 22, 2004.

(51) Int. Cl.
*G06F 9/00* (2006.01)
(52) U.S. Cl. .......................................... 712/220; 712/20
(58) Field of Classification Search ................. 712/220, 712/20
See application file for complete search history.

(56) References Cited

U.S. PATENT DOCUMENTS

| | | | |
|---|---|---|---|
| 5,555,428 A | 9/1996 | Radigan et al. | |
| 5,926,644 A | 7/1999 | Hays et al. | |
| 6,606,699 B2 * | 8/2003 | Pechanek et al. | 712/16 |
| 6,826,662 B2 | 11/2004 | Suzuoki et al. | |
| 6,839,828 B2 * | 1/2005 | Gschwind et al. | 712/20 |
| 6,944,744 B2 * | 9/2005 | Ahmed et al. | 712/20 |
| 6,970,994 B2 * | 11/2005 | Abdallah et al. | 712/22 |
| 7,146,486 B1 * | 12/2006 | Prokopenko et al. | 712/22 |
| 7,249,350 B2 * | 7/2007 | Wang et al. | 717/136 |
| 2003/0097542 A1 | 5/2003 | Canella et al. | |

OTHER PUBLICATIONS

Kennedy, K. et al: "Context optimization for SIMD execution", Scalable High-Performance Computing Conference, 1994, Proceedings of the Knoxville, TN, USA May 23-25, 1994, Los Alamitos, CA, USA, IEEE Comput. Soc, May 23, 1994, pp. 445-453, XP010098985, ISBN: 0-8186-5680-8, p. 445, col. 1, lines 24-31, p. 445, col. 2, lines 19-32.

* cited by examiner

*Primary Examiner*—Eddie Chan
*Assistant Examiner*—Jacob Petranek
(74) *Attorney, Agent, or Firm*—Lerner, David, Littenberg, Krumholz & Mentlik, LLP

(57) ABSTRACT

A method is provided for executing a plurality of parallel executable sequences of instructions on a processor having a plurality of execution units operated by a single instruction unit. The method includes a) detecting a plurality of sequences of instructions adapted for parallel execution from instructions being provided to the processor, wherein each sequence is adapted for execution by a subset of the plurality of execution units and b) storing information representing a stall status of the execution units. Then, a step c) is performed, wherein, for each unexecuted sequence of the plurality of sequences: i) all of the plurality of execution units other than the subset which corresponds to the unexecuted sequence are stalled, and ii) the sequence of instructions is executed by the corresponding subset. Thereafter, it is determined in a step d) whether a current stall status of the plurality of execution units matches the stall status represented by the stored information. When there is no match, the steps b) through d) are repeated until there is a match in which the current stall status represented by the stored information matches the stored information.

23 Claims, 6 Drawing Sheets

MULTI-SCALAR EXTENSION FOR SIMD INSTRUCTION SET PROCESSORS

CROSS-REFERENCE TO RELATED APPLICATIONS

This application claims the benefit of the filing date of U.S. Provisional Patent Application No. 60/564,673 filed Apr. 22, 2004, the disclosure of which is hereby incorporated herein by reference.

BACKGROUND OF THE INVENTION

The present invention relates to computing systems. Many programs are written with a particular type of processor in mind. Some programs are intended to be executed by a SIMD (single instruction multiple data) type processor. Some programs require the processor to be capable of multi-scalar execution in order to perform well. It would be desirable to provide multi-scalar execution capability to SIMD instruction set processors.

SUMMARY OF THE INVENTION

According to an aspect of the invention, a method is provided for executing a plurality of parallel executable sequences of instructions on a processor having a plurality of execution units operated by a single instruction unit. The method includes a step a) of detecting a plurality of sequences of instructions adapted for parallel execution from instructions being provided to the processor, wherein each sequence is adapted for execution by a subset of the plurality of execution units and a step b) of storing information representing a stall status of the execution units.

Then, a step c) is performed for each unexecuted sequence of the plurality of sequences wherein: i) all of the plurality of execution units other than the subset which corresponds to the unexecuted sequence are stalled, and ii) the sequence of instructions are executed by the corresponding subset.

Thereafter, it is determined d) whether a current stall status of the plurality of execution units matches the stall status represented by the stored information. When there is no match, the steps b) through d) are repeated until there is a match in which the current stall status represented by the stored information matches the stored information.

DETAILED DESCRIPTION

Figure 1:
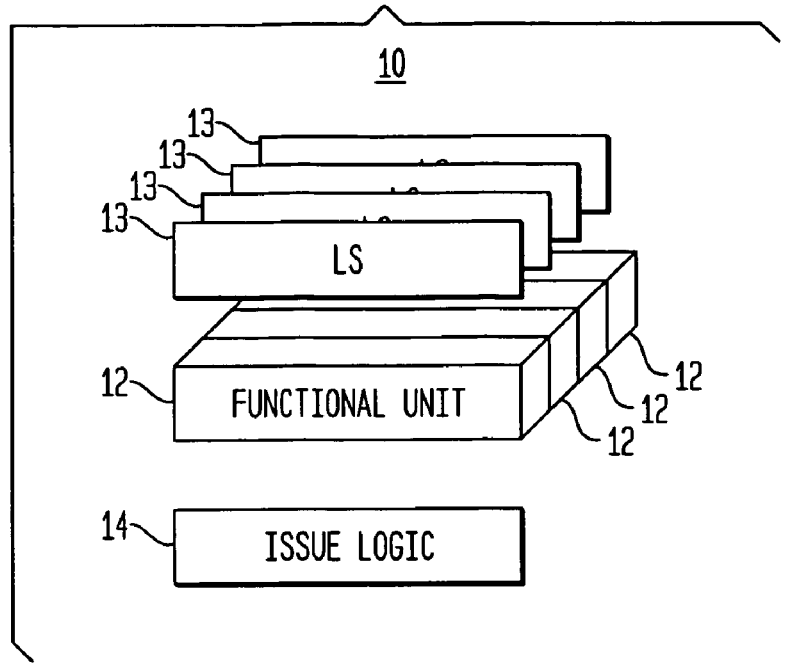
FIGS. 1 through 3 illustrate an organization of a processor and a processing method in relation to which the present invention is described.

FIG. 1 illustrates an organization of a synergistic processor unit (SPU) 10, within which a processor and a method of executing instructions are provided, according to embodiments of the invention. The SPU can be a standalone processor or support operation of a larger-scale processor, for example, a processor unit (PU) or broadband engine (BE) such as described in commonly-owned U.S. Pat. No. 6,826,662, which is hereby incorporated by reference herein. As illustrated in FIG. 1, the SPU 10 includes a plurality of functional units 12, each one capable of executing floating point and integer instructions. The four functional units of the SPU 10 are like four processors in that they each have a 32 bit arithmetic logic unit (ALU), a floating point operations unit, and a shift/shuffle unit. The functional units can be operated together to provide 128 bit wide data processing, can be operated individually to provide 32 bit wide data processing, and can be operated in subsets of functional units, two or more such functional units operating together on data having a bit width of n×32 bits. The SPU 10 also includes four local stores 13, each one operable to be written with information provided from a corresponding one of the functional units 12, and to store information to be read by the corresponding one of the functional units 12.

The SPU 10 further includes issue logic 14, the function of which is to convert instructions received at the SPU 10 into operations to be performed by the functional unit 12 to carry out the instruction. The organization of the SPU 10 into a plurality of functional units and local stores enables the processor 10 to execute an instruction simultaneously by all four of the functional units 12 on data held by the four functional units 12. Such manner of executing instructions is referred to as single instruction multiple data, or ("SIMD") because the same instruction is executed simultaneously by several execution units as to different data held by each of the several execution units. The issue logic 14 is limited to a single instance capable of preparing one instruction at a time for execution, in order to lower the amount of circuitry required to implement the SPU 10.

Organization of the SPU into a plurality of functional units 12 and corresponding local stores 13 lowers the functional requirements of each of the functional units and local stores in relation to that which one large functional unit and local store doing comparable work would require. In addition to the capability that the processor 10 already has in executing sequences of SIMD instructions, it would be desirable to provide a processor capable of executing both SIMD instruction sequences as described above and other instruction sequences containing parallel executable instructions. By parallel executable instruction sequences are meant instruction sequences adapted to be executed by separate subsets of the functional units 12 of the processor 10 without either such instruction sequence being contingent upon the results of executing the other. Execution of instruction sequences in parallel, without having the execution of one sequence depend upon the results of another such instruction sequence is referred to as multi-scalar operation. Since the issue logic 14 is capable of preparing only one instruction for execution per cycle by any of the functional units 12, it is desirable to provide a way of executing such parallel executable instruction sequences by different functional units and different subsets of functional units sequentially, and resuming execution of SIMD instruction sequences thereafter.

Figure 2:
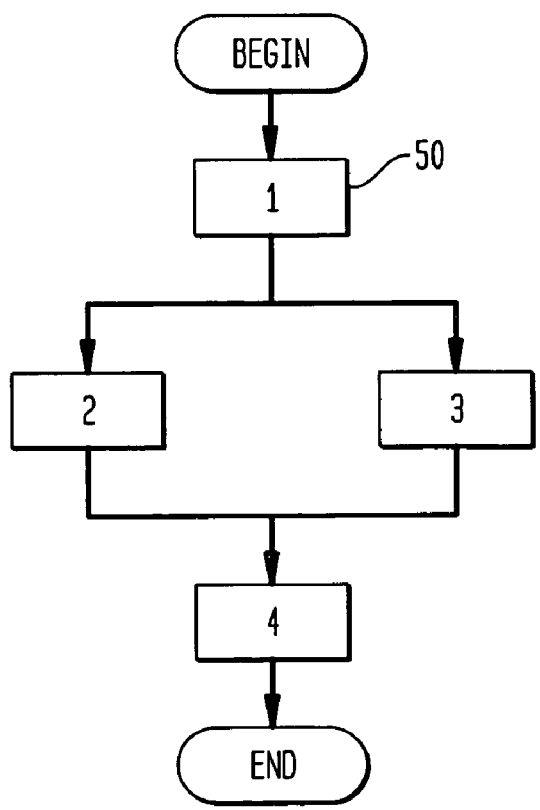
Figure 3:
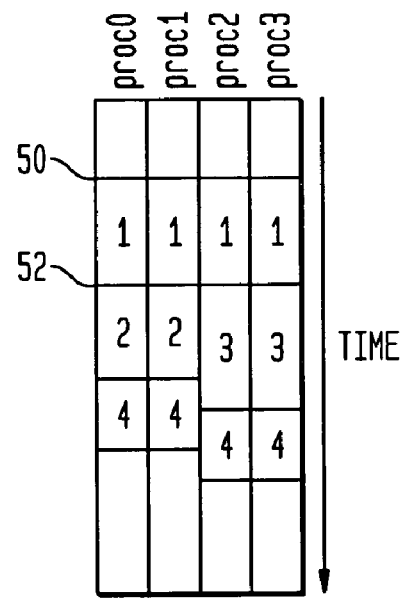

FIG. 2 is a flow diagram illustrating the execution of parallel executable instruction sequences by independent processors. Parallel executable instruction sequences include those which are capable of execution in the manner described here. In this example, unlike the SPU 10 described above, the parallel executable instruction sequences are simultaneously executed by processors operating in separate subsets, i.e. a first subset of processors 0 and 1, and a second subset of processors 2 and 3. FIG. 3 illustrates the execution of each instruction sequence by processors 0 through 3. As shown in FIG. 3, at time 50, instruction sequence 1 is executed by all four processors 0 through 3. Then, at time 52, processors 0 and 1 begin executing instruction sequence 2, while processors 2 and 3 begin executing instruction sequence 3. In such example, both instruction sequences can be executed at the same time because each of the processors is independent and has its own issue logic. When instruction sequences 2 and 3 are finished executing, instruction sequence 4 is then executed by all of the processors 0 through 3 operating together again.

A difference of the SPU 10 from the four processor arrangement of FIG. 2 is that the functional units of SPU 10 are not independent, since they are all operated by a single instruction unit using the same issue logic 14. It would be desirable to provide a way of executing a plurality of parallel executable sequences of instructions by an SPU 10 at certain times, in a manner which allows SIMD instruction sequences to be executed by all of the functional units 12 of the SPU 10 at other times.

Figure 4:
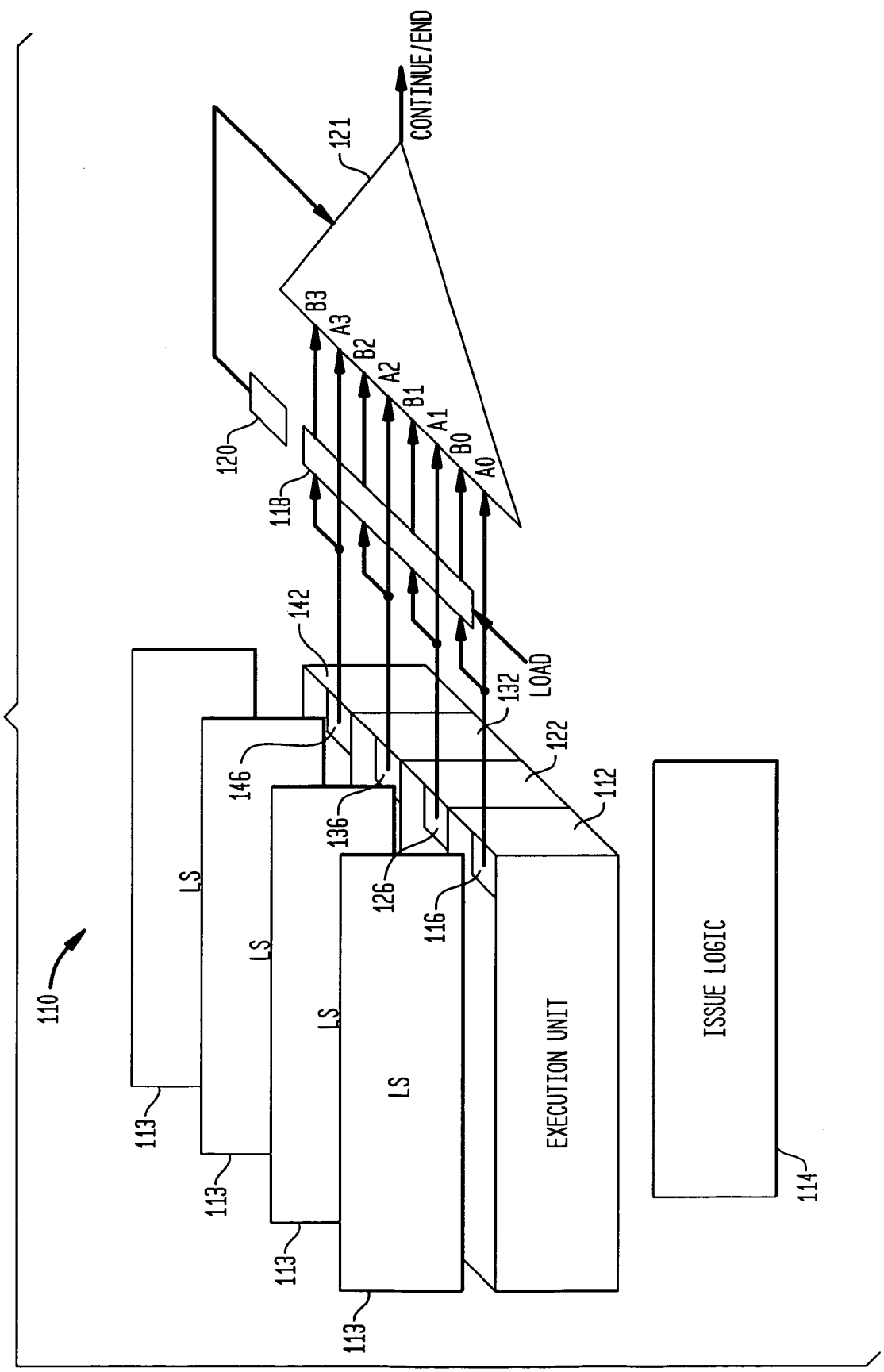
FIG. 4 is a block diagram illustrating a processor organization according to an embodiment of the invention.

Particular embodiments of the invention will now be described with reference to FIGS. 4 through 8. FIG. 4 illustrates a method of executing instructions according to a first preferred embodiment of the invention. According to such embodiment, a method is provided for executing a parallel executable instruction sequence in a subset of the execution units of the processor, while stalling the remaining execution units. With reference to FIG. 1, "execution units" are the units of a processor, for example, functional units 12, as described above, which are capable of executing instructions under the control of issue logic 14. By such method, the parallel executable instruction sequences are executed sequentially by respective subsets of the execution units of the processor. When all of the parallel executable instruction sequences have been executed, the processor then resumes executing SIMD instruction sequences by all of the execution units.

Embodiments of the invention will now be described with respect to FIGS. 4, 5 and 6. As illustrated in FIG. 4, the processor 110 includes a plurality of execution units 112, 122, 132 and 142 similar to the functional units 12 described above with respect to FIG. 1. The issue logic 114 and the local stores 113 are similar to those elements of the SPU 10 described above with respect to FIG. 1. The processor 110 differs from the SPU 10 described above in that it further includes a plurality of stall flags 116, 126, 136 and 146, one for each of the execution units, and further includes a checkpoint register 118 which holds as many bits as the number of stall flags. The processor 110 further includes a stall status flag 120 and a comparator 121.

The stall flags function to indicate whether or not the particular execution unit 112, 122, 132 or 142 of the processor is stalled. The stall status flag 120 indicates whether a stall flag of any of the execution units 112, etc. has been set. The checkpoint register 118 stores information representing the status of the stall flags at a particular time, as determined by a LOAD signal input to the register 118.

Figure 5:
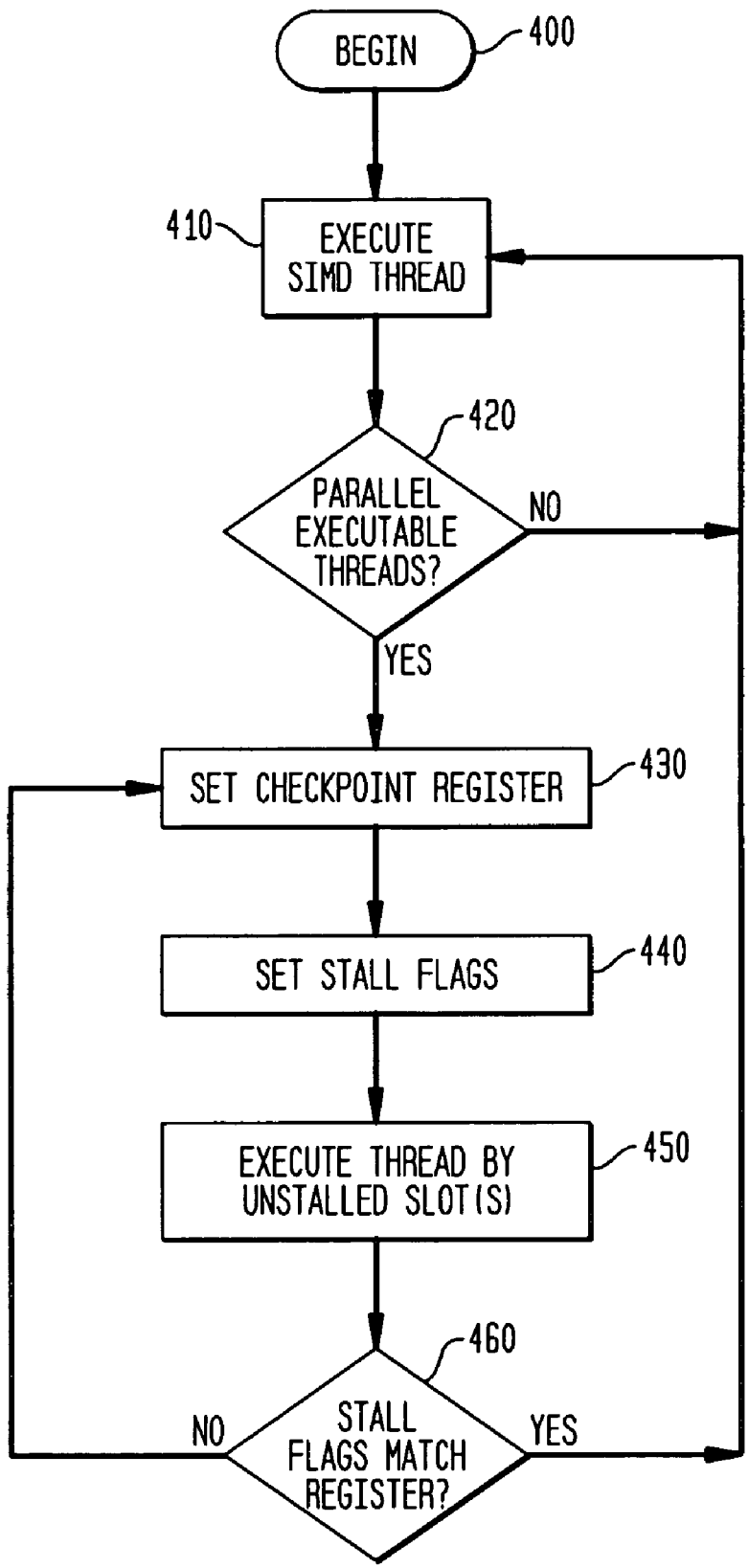
FIG. 5 is a flow diagram illustrating operations according to a particular embodiment of the invention.

In the method illustrated in FIG. 5, execution of instructions by four execution units 112 of an SPU 113 (FIG. 1) begins at 400. Typically, some instruction sequences are SIMD (single instruction multiple data) in type, such that each instruction in the SIMD sequence is executed simultaneously by all execution units 112, 122, 132 and 142, at block 410. Other instruction sequences, however, are not SIMD instruction sequences, but rather, parallel executable instruction sequences to be executed by subsets of the execution units 112, 122, 132 and 142 of the processor 110.

When a particular SIMD thread is finished executing, it is determined, at block 420, whether the instructions provided to the processor for execution include parallel executable threads. Such parallel executable threads have the definition given above to parallel executable instruction sequences. Such threads are capable of being executed simultaneously by independent processors or groups of processors, if such were present. For simplicity of description, this step is shown being performed after executing a SIMD instruction sequence. However, such determination is ordinarily made every time an instruction sequence is provided to the processor, whether that occurs before or after executing a SIMD instruction sequence.

If the result of the determination at block 420 is Yes, then operations are performed to sequentially execute the parallel executable instruction sequences by respective subsets of the execution units, under control of the issue logic 14. Operations are as follows. At block 430, information as to the current stall status of the execution units 112, 122, 132 and 142 is stored in the checkpoint register 118. Desirably, such information is stored to the checkpoint register 118 from the stall flags 116, 126, 136, and 146 that indicate the stall status of each execution unit.

Thereafter, it is determined the subset of the execution units 112, 122, 132 and 142 which will execute the parallel executable instruction sequence, including determining the particular ones of the execution units 112, 122, 132 and 142 that will execute the instruction sequence. Then, at block 440, the stall flags are set for all of the execution units 112, 122, 132 and 142 that remain after determining the particular subset that will execute the instruction sequence.

Figure 6:
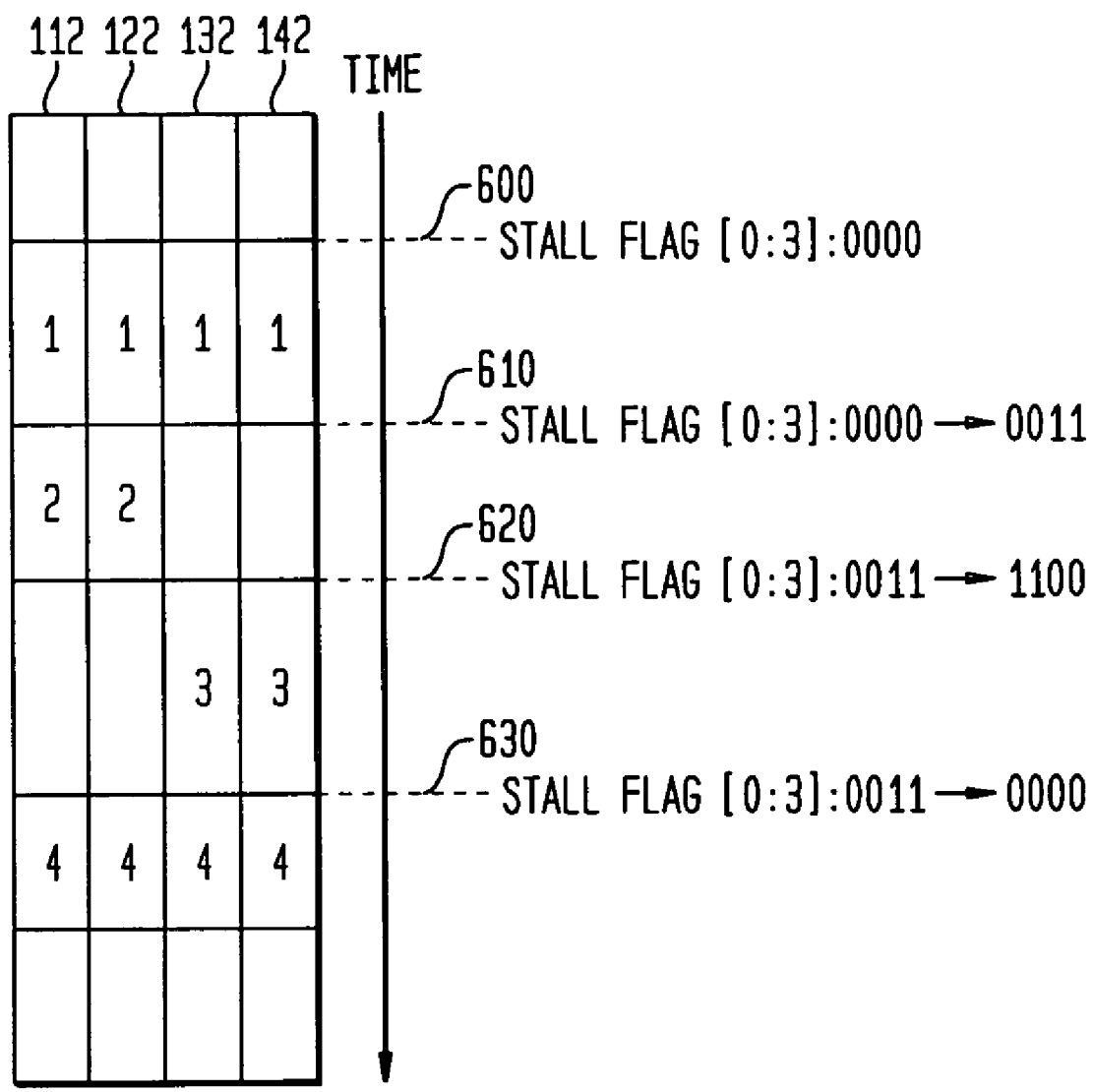
FIG. 6 is a timing diagram of operations according to the embodiment of the invention illustrated in FIG. 5.

The assignment of the subset of execution units and the stalling of others is shown more clearly in FIG. 6. The execution of four instruction sequences numbered 1 to 4 by the execution units 112, 122, 132 and 142 is illustrated with respect to time therein, as well as the stall flag status at the changeover between instruction sequences. Thus, at time 600, an instruction sequence 1 is provided to the processor 110 which is capable of SIMD execution. This corresponds to the SIMD execution block 410 of FIG. 5. As all execution units are assigned to execute the instruction sequence, none of the stall flags 116, 126, 136 and 146 are set, and the stall status flag is "0000", thereby indicating no flags are set. Accordingly, execution of the instruction sequence proceeds in all execution units 112, 122, 132 and 142.

However, at time 610, the SIMD instruction sequence has finished executing, and parallel executable instruction sequences 2 and 3 are received for execution by different subsets of the execution units 112, 122, 132 and 142 of the processor. At such time 610, information is stored (block 430, FIG. 5) to the checkpoint register which indicates the stall status of the execution units, prior to beginning operations to execute the parallel executable instruction sequence. Thus, prior to stalling any of the execution units 112, 122, 132 and 142 to execute one of the parallel executable instruction sequences, information is stored to the checkpoint register at block 430 to indicate the stall status of the execution units 112, 122, 132 and 142 just prior thereto.

Then, at block 440 (FIG. 5), the stall flags 136, 146 are set for the subset of the execution units 134, 142 of the processor 110 that are stalled when the instruction sequence 2 is executed, such that the stall flag status is now "0011". Processing then proceeds with the execution units 132 and 142 stalled while execution units 112 and 122 execute the instruction sequence 2 (block 450).

Then, after the instruction sequence finishes executing at time 620 (FIG. 6), a check is made to determine whether additional parallel executable instruction sequences remain to be executed. Such check is illustrated at block 460 of FIG. 5 in which the current stall flags are compared to the information stored in the checkpoint register as to the stall flags. If the current stall flags match the stored stall flag information, then it is determined that no more such instruction sequences remain to be executed. Processing therefore resumes as normal with the execution of a SIMD instruction sequence again, as indicated at block 410. However, if the current stall flags do not match the stored stall flag information, then it is determined that an instruction sequence does, in fact, remain to be executed. In such case, as indicated at block 430, information is again stored to the checkpoint register as to the current stall flag status, which is now "0011".

Thereafter, as indicated at block 440, stall flags 116, 126 are set for all of the execution units 112, 122, 132 and 142 except those which belong to the subset of execution units 132 and 142 which will execute the remaining parallel executable instruction sequence 3. The stall flags thus show "1100" at that time. The instruction sequence 3 is then executed by the execution units 132, 142, as indicated at block 450.

When instruction sequence 3 is finished executing, a check is performed again (block 460) to determine whether another such parallel executable instruction sequence remains. The current stall flags "1100" are compared to stored stall flag information "0011" held in the checkpoint register. Since the values do not match, control is returned to block 430. At block 430, the checkpoint register is stored with the current stall flag status "1100". Operation then proceeds to block 440. However, since no other parallel executable instruction sequences are present, no stall flags are set at block 440, and no other instruction sequence is executed, at block 450. Accordingly, when a check is next performed, at block 460, it is determined that the stored stall flag information "1100" now matches the current stall flags "1100". In such case, the outcome is Yes, and processing proceeds again at block 410 with the execution of a SIMD instruction sequence.

Figure 7:
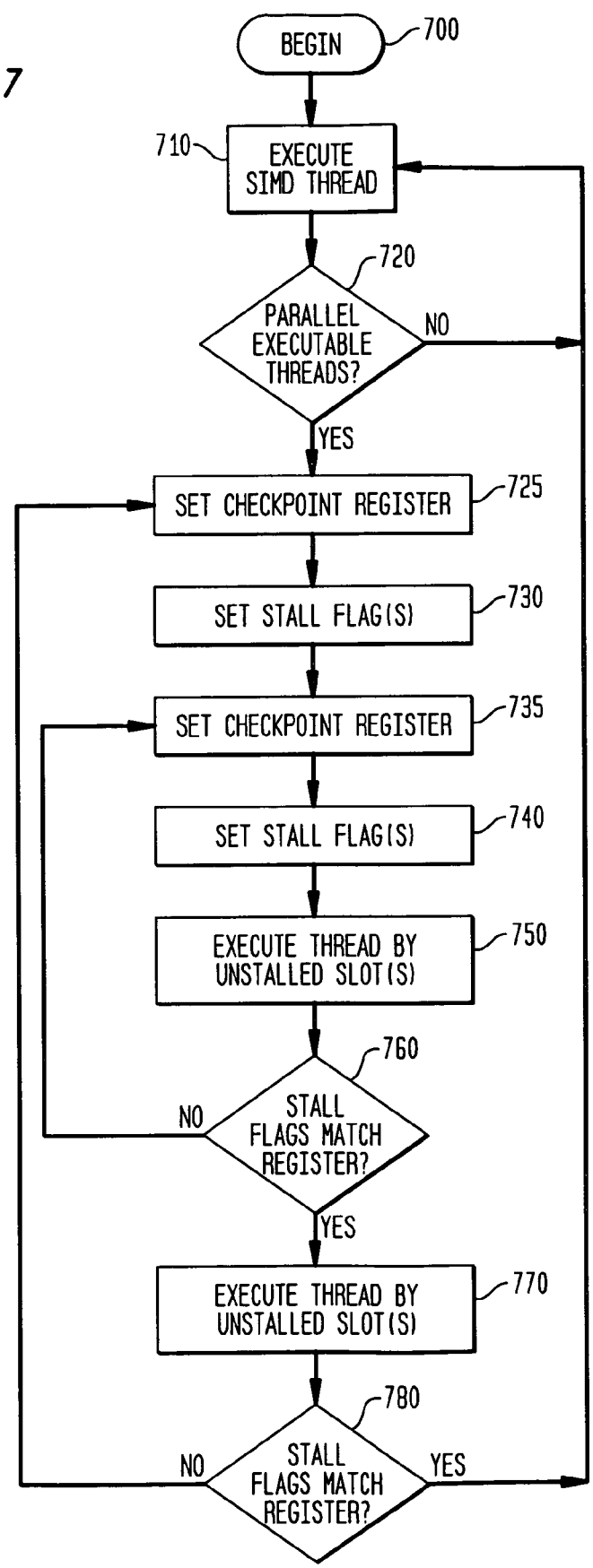
FIG. 7 is a flow diagram illustrating operations according to a particular embodiment of the invention.
Figure 8:
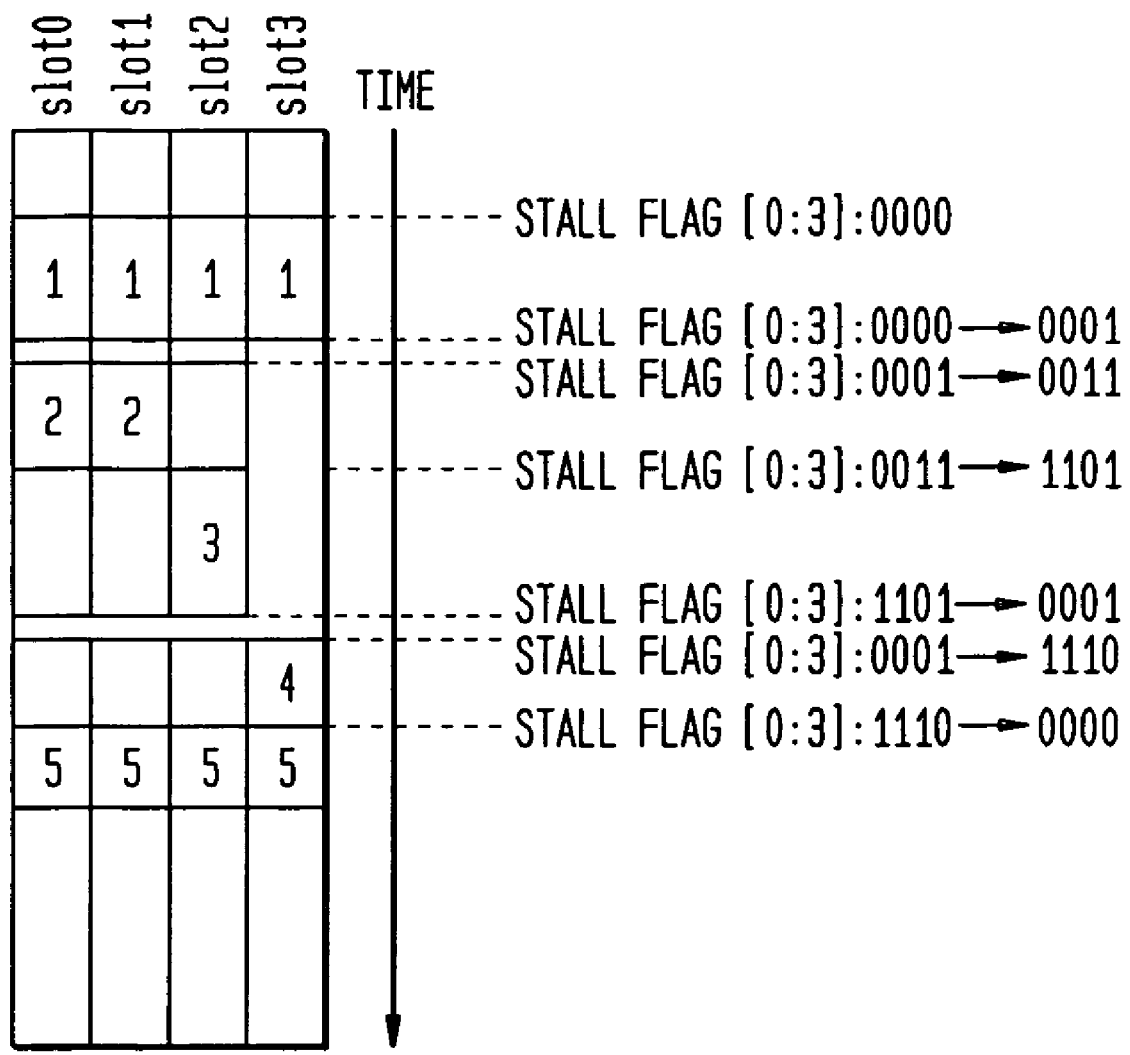
FIG. 8 is a timing diagram of operations according to the embodiment of the invention illustrated in FIG. 5.

A particular embodiment is now described with respect to FIGS. 7 and 8. FIG. 7 is a flow diagram illustrating a method of executing instruction sequences according to such embodiment, while FIG. 8 illustrates changes in the stall flag status during operation according to such embodiment. In such embodiment, the processor 110 is organized as that described above with respect to FIG. 4. The embodiment illustrated in FIGS. 7-8 differs from the embodiment described above relative to FIGS. 4-6 in that the execution of parallel executable instruction sequences is performed in a nested manner. Stated another way, the execution of a particular parallel executable instruction sequence is delayed until other such instruction sequences complete execution.

As shown in FIG. 7, the operations performed with respect to blocks 700, 710, 720 and 780 and are the same as those described above with respect to blocks 400, 410, 420 and 460 of FIG. 5. Each time the checkpoint register is set, it is set with the then existing stall flag information.

A particular example will now be described, with respect to FIGS. 7 and 8. At block 720 it is determined that parallel executable instruction sequences are present at the processor 110 for execution. At block 725, the checkpoint register is set, which then stores the stall flag status of "0000". Next, at block 730 a stall flag is set for an instruction sequence 4 which is required to wait until the other instruction sequences are finished executing. This results in the execution unit 142 being stalled, and the stall flag status becoming "0001".

Thereafter, operations are performed with respect to blocks 735 to 760, which are the same as those described above with respect to blocks 430 to 460 of FIG. 5. During such time, instruction sequence 2 is first executed, then instruction sequence 3 is executed, and then it is determined in block 760 that the current stall flags at "0001" match the stall flag status of "0001" which is stored in the checkpoint register.

At such time, the previously set stall flag status of "0001" is updated to "1110", and control is passed to executing the remaining instruction sequence by execution unit 4 which is now released for execution. Finally, when instruction sequence 4 finishes executing, the stall flag status is again checked against that stored in the checkpoint register at block 780 and when it matches, execution of a SIMD instruction sequence proceeds again, at block 710.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of executing a plurality of parallel executable sequences of instructions on a processor having a plurality of execution units operated by a single instruction unit, comprising:
   a) detecting a plurality of sequences of instructions adapted for parallel execution from instructions being provided to said processor, each sequence of said plurality of sequences adapted for execution by a subset of said plurality of execution units,
   b) storing information in a register representing a stall status of said execution units;
   c) for each unexecuted sequence of said plurality of sequences:
      i) stalling all of said plurality of execution units other than said subset which corresponds to said unexecuted sequence and setting a current stall status for said stalled execution units;
      ii) executing said sequence of instructions by said corresponding subset;
   d) determining whether the current stall status of said plurality of execution units matches the stall status represented by said stored information; and
   e) when there is no match, repeating said steps b) through d) until there is a match in which the current stall status matches said stored information.

2. A method as claimed in claim 1 wherein each said subset is orthogonal to every other said subset such that no two subsets both include the same execution unit.

3. A method as claimed in claim 2, wherein said current stall status is set by setting a stall flag upon stalling an execution unit of said plurality of execution units, said stall flag indicating that a particular execution unit of said plurality of execution units is stalled.

4. A method as claimed in claim 3 further comprising setting a stall status flag when any execution unit of said plurality of execution units is stalled.

5. A method as claimed in claim 1 wherein said plurality of execution units includes four execution units, each of said four execution units operable to receive data from a corresponding local store of four local stores coupled to provide data to and receive data from said processor.

6. A method as claimed in claim 1 wherein said processor includes a number p of said execution units and each of said execution units is operable to execute instructions on operands having a data width of m bits, such that said processor is operable to execute an instruction simultaneously as to data having a width ranging between m bits and p×m bits.

7. A method as claimed in claim 6 wherein m=32bits and p=4.

8. A method as claimed in claim 7 further comprising simultaneously executing, by all of said execution units, sequences of instructions other than said sequences of parallel executable instructions.

9. A method as claimed in claim 8 wherein said sequences of instructions other than said sequences of parallel executable instructions are executed as to data obtained from a plurality of local stores.

10. A method as claimed in claim 1 further comprising, prior to first performing said step b):
   a) i) initially storing information in a register representing a stall status of said execution units;
   a) ii) stalling one or more of said execution units and setting a current stall status for said stalled execution units; and, after performing said steps c) through e) performing:
   f) for each unexecuted sequence of said plurality of sequences:
      i) stalling all of said plurality of execution units other than said subset which corresponds to said unexecuted sequence and setting the current stall status for said stalled execution units;
      ii) executing said sequence of instructions by said corresponding subset;
      iii) determining whether the current stall status of said plurality of execution units matches the stall status represented by said stored information; and
      iv) when there is no match, repeating said steps a) i) through f) iii) until there is a match in which the current stall status matches said stored information.

11. A processor, comprising:
   a single instruction unit;
   a plurality of execution units operable to individually or collectively execute an instruction under control of said single instruction unit;
   wherein said processor is operable to
   a) detect a plurality of sequences of instructions adapted for parallel execution from instructions being provided to said processor, each sequence of said plurality of sequences being executable by a subset of said plurality execution units,
   b) store information in a register representing a stall status of said execution units;
   c) for each unexecuted sequence of said plurality of sequences:
      i) stall all of said plurality of execution units other than said subset which corresponds to said unexecuted sequence and set the current stall status for said stalled execution units;
      ii) execute said sequence of instructions by said corresponding subset;
   d) determine whether the current stall status of said execution units matches the stall status represented by said stored information; and
   e) when there is no match, repeat said steps b) through d) until there is a match in which the current stall status matches the stall status represented by the stored information.

12. A processor as claimed in claim 11 wherein each said subset is orthogonal to every other subset of said plurality of subsets such that no two of said subsets both include the same execution unit.

13. A processor as claimed in claim 11 wherein said processor is further operable to set said current stall status by setting a stall flag upon stalling an execution unit of said plurality of execution units, said stall flag indicating that a particular execution unit of said plurality of execution units is stalled.

14. A processor as claimed in claim 13 wherein said processor is further operable to set a stall status flag when any execution unit of said plurality of execution units is stalled.

15. A processor as claimed in claim 12 further comprising four local stores, wherein said plurality of execution units includes four execution units, each operable to receive data from and to store data to a corresponding local store of said four local stores.

16. A processor as claimed in claim 15 wherein said processor includes a number p of said execution units each operable to execute instructions on operands having a data width of m bits, such that said processor is operable to execute an instruction simultaneously as to data having a width ranging between m bits and p×m bits.

17. A processor as claimed in claim 16 wherein m=32 bits and p=4.

18. A processor as claimed in claim 15 wherein said processor is operable to execute said instruction as to data obtained from all of said corresponding local stores.

19. A processor as claimed in claim 11 wherein said processor is further operable to perform, prior to first performing said step b):
   a) i) initially storing information in a register representing a stall status of said execution units;
   a) ii) stalling one or more of said execution units and setting a current stall status for said stalled execution units; and, after performing said steps c) through e) performing:
   f) for each unexecuted sequence of said plurality of sequences:
      i) stalling all of said plurality of execution units other than said subset which corresponds to said unexecuted sequence and setting the current stall status for said stalled execution units;
      ii) executing said sequence of instructions by said corresponding subset;
      iii) determining whether the current stall status of said plurality of execution units matches the stall status represented by said stored information; and
      iv) when there is no match, repeating said steps a) i) through f) iii) until there is a match in which the current stall status matches said stored information.

20. A method as claimed in claim 1 wherein each of the steps a) through e) are performed in the order the steps are listed.

21. A method as claimed in claim 20 wherein the steps c)i) through c)ii) are performed in the order the steps are listed.

22. A processor as claimed in claim 11 wherein said processor is operable to perform the steps a) through e) in the order the steps are listed.

23. A processor as claimed in claim 22 wherein said processor is operable to perform the steps c)i) through c)ii) in the order the steps are listed.

* * * * *